(12) United States Patent
Jung et al.

(10) Patent No.: US 8,208,850 B2
(45) Date of Patent: Jun. 26, 2012

(54) PORTABLE DEVICE AND METHOD FOR ENTERTAINMENT INTERACTION DATA

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 686 days.

(21) Appl. No.: 11/362,541

(22) Filed: Feb. 24, 2006

(65) Prior Publication Data

US 2007/0203968 A1    Aug. 30, 2007

(51) Int. Cl.
*H04H 40/00*    (2008.01)
(52) U.S. Cl. .................. 455/3.06; 455/418; 709/231
(58) Field of Classification Search .................. 455/418, 455/419, 420, 3.06
See application file for complete search history.

(56) References Cited

U.S. PATENT DOCUMENTS

| | | | | |
|---|---|---|---|---|
| 5,450,079 | A * | 9/1995 | Dunaway | 341/23 |
| 6,557,172 | B1 * | 4/2003 | Carr | 725/139 |
| 7,046,649 | B2 * | 5/2006 | Awater et al. | 370/338 |
| 7,433,546 | B2 | 10/2008 | Marriott et al. | |
| 2003/0065802 | A1 * | 4/2003 | Vitikainen et al. | 709/231 |
| 2003/0073432 | A1 * | 4/2003 | Meade, II | 455/420 |
| 2005/0064814 | A1 | 3/2005 | Matsuo et al. | |
| 2006/0246899 | A1 * | 11/2006 | Buckley et al. | 455/435.2 |
| 2007/0010195 | A1 * | 1/2007 | Brown et al. | 455/3.06 |

OTHER PUBLICATIONS

In-Yeup Kong; Jae-Heon Kim; Suk-Ho Lee; Jung-Tae Lee; Won-Joo Hwang ,"Design and implementation of ontology-based context reasoning engine for adaptive multimedia service migration", Proceedings of 7th International Workshop on Enterprise networking and Computing in Healthcare Industry, IEEE, Jun. 23, 2005 pp. 248-252.*
Diomidis D. Spinellis, "The Information furnace: consolidated home control", Aug. 14, 2002, Springer-Verlag London Limited.*
N. Freed, N. Borenstein, RFC 2046 Multipurpose Internet Mail Extensions, Nov. 1996.*
"Slingbox brings home TV to your phone a great digital entertainment device gets even better" Gary Krakow, Columnist MSNBC—Jan. 5, 2006 htp://msnbc.msn.com/id/10722961/.
"The IPG Goes New Media: On the Energence of Trans-Platform Personal Entertainment Guides", The Diffusion Group—www.thediffusiongroup.com.
"Near Field Communication White Paper", ecam International Ecma/TC32-TG19/2004/1.

* cited by examiner

*Primary Examiner* — Vladimir Magloire

(57) ABSTRACT

A system and method for use with a portable device, includes but is not limited to a method including accessing of one or more entities computationally capable of being networked to one or more of the portable device and/or a computing device operable via a user interface, querying of the one or more entities to determine one or more interaction capabilities between the portable device and the one or more entities and actuating user enhancement data in association with one or more of multimedia data, multimedia streams and/or multimedia content on the portable device retrieved from the one or more entities and/or a source operably coupled to the one or more entities.

39 Claims, 5 Drawing Sheets

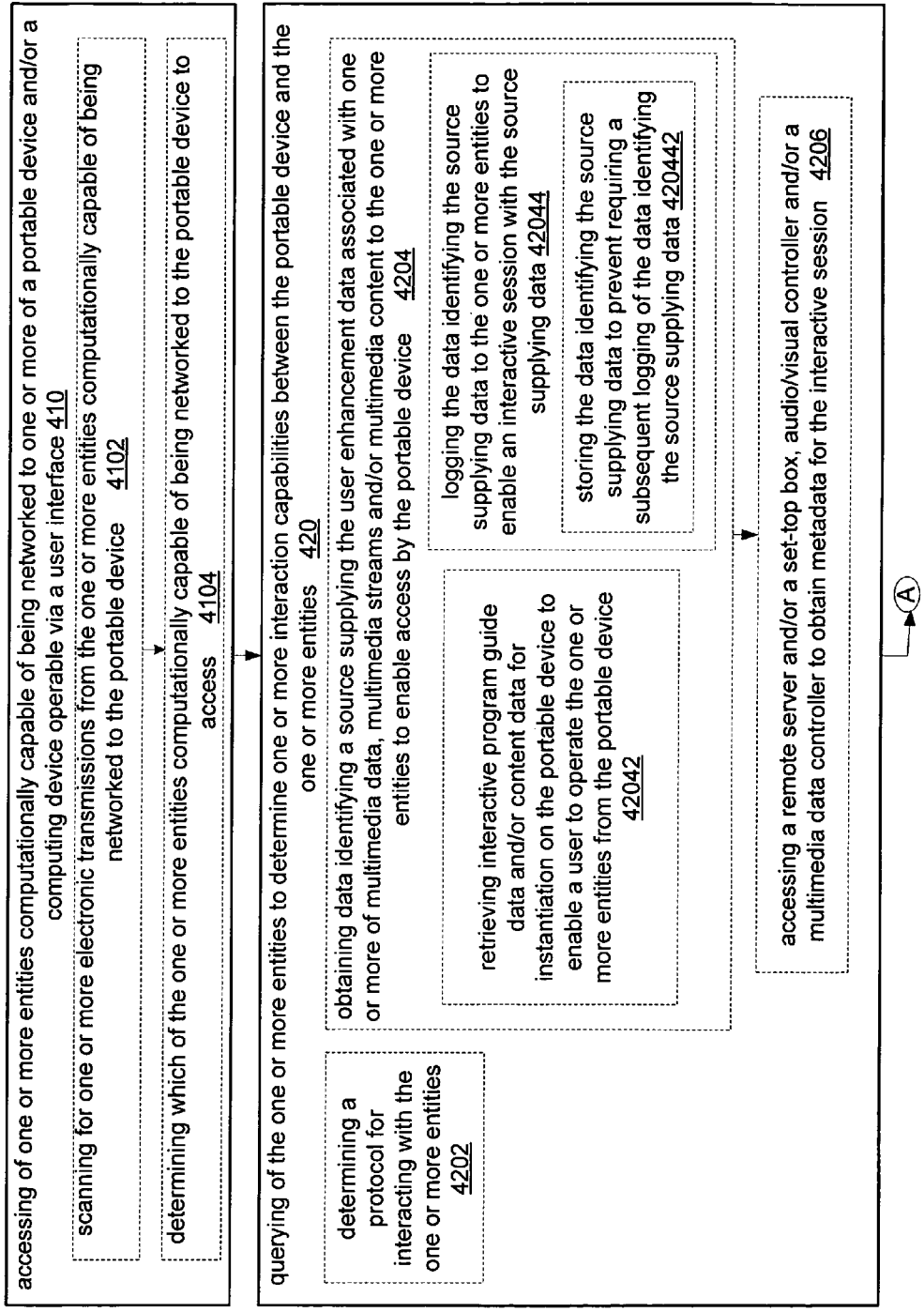

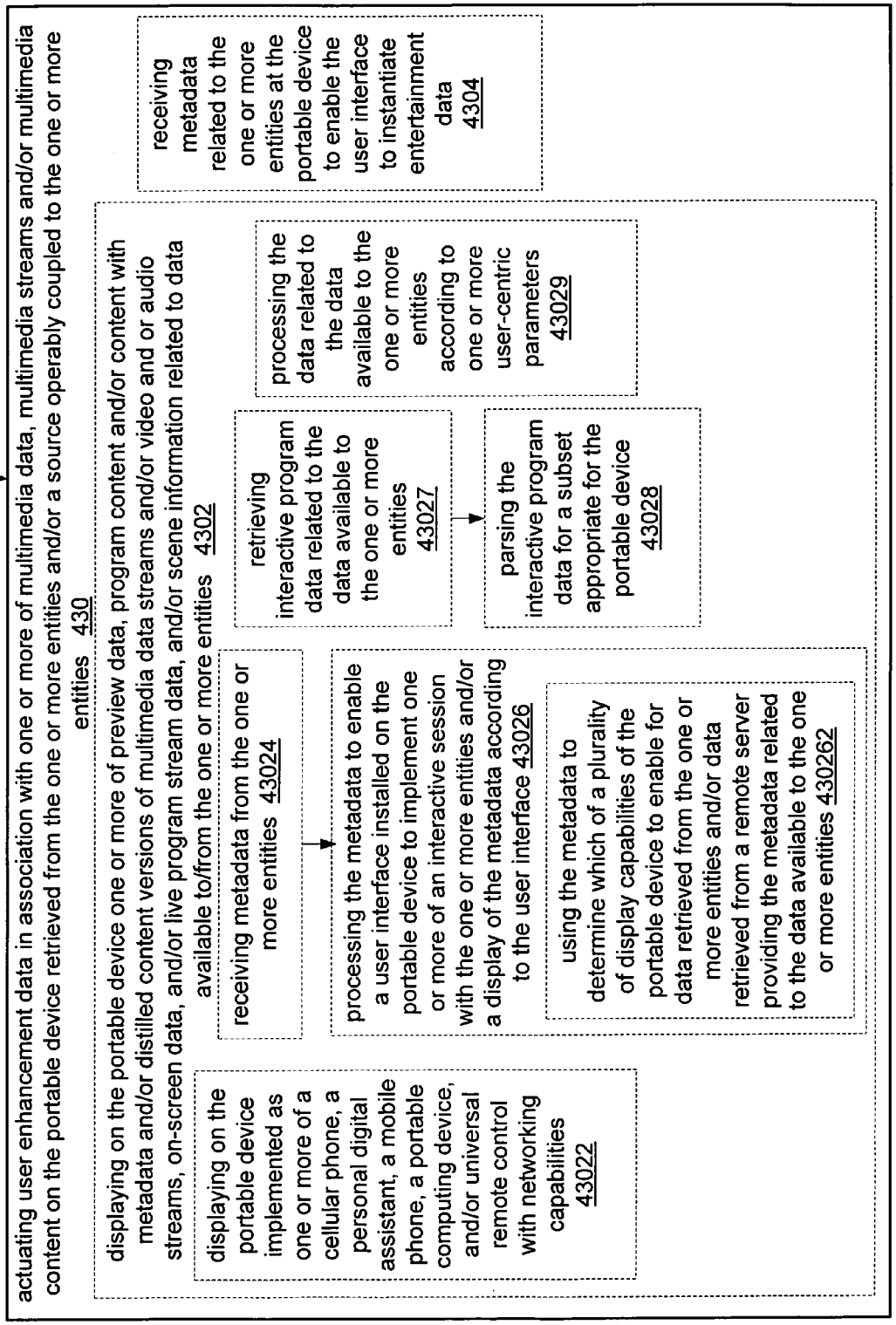

PORTABLE DEVICE AND METHOD FOR ENTERTAINMENT INTERACTION DATA

TECHNICAL FIELD

The present application relates generally to entertainment systems.

SUMMARY

In one aspect, a method for operating a portable device includes but is not limited to accessing of one or more entities computationally capable of being networked to one or more of the portable device and/or a computing device operable via a user interface; querying of the one or more entities to determine one or more interaction capabilities between the portable device and the one or more entities; and actuating user enhancement data in association with one or more of multimedia data, multimedia streams and/or multimedia content on the portable device retrieved from the one or more entities and/or a source operably coupled to the one or more entities In addition to the foregoing, other method aspects are described in the claims, drawings, and text, forming a part of the present application.

In another aspect, a computer program product includes but is not limited to a signal bearing medium, bearing at least one of one or more instructions for accessing of one or more entities computationally capable of being networked to one or more of the portable device and/or a computing device operable via a user interface; one or more instructions for querying of the one or more entities to determine one or more interaction capabilities between the portable device and the one or more entities; and one or more instructions for actuating user enhancement data in association with one or more of multimedia data, multimedia streams and/or multimedia content on the portable device retrieved from the one or more entities and/or a source operably coupled to the one or more entities. In addition to the foregoing, other computer program product aspects are described in the claims, drawings, and text, forming a part of the present application.

In one or more various aspects, related systems include but are not limited to circuitry and/or programming for effecting the herein-referenced method aspects; the circuitry and/or programming can be virtually any combination of hardware, software, and/or firmware configured to affect the herein-referenced method aspects depending upon the design choices of the system designer. In addition to the foregoing, other system aspects are described in the claims, drawings, and text forming a part of the present application.

In one aspect, a portable device includes but is not limited to a one or more processors, an audio and/or video input and/or output circuitry coupled to the processor, a a memory coupled to the processor, a memory coupled to the processor, a user interface module coupled to the one or more processors for actuating user enhancement data in association with one or more of multimedia data, multimedia streams and/or multimedia content on the portable device retrieved from the one or more entities and/or a source operably coupled to the one or more entities, an access module coupled to the one or more processors for accessing of one or more entities computationally capable of being networked to one or more of the portable device and/or a computing device operable via a user interface, and a query module coupled to the one or more processors for querying of the one or more entities to determine one or more interaction capabilities between the portable device and the one or more entities. In addition to the foregoing, other portable device aspects are described in the claims, drawings, and text forming a part of the present application.

In addition to the foregoing, various other method, system, computer program product, and/or portable device aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject described herein will become apparent in the text set forth herein.

BRIEF DESCRIPTION OF THE DRAWINGS

A better understanding of the subject matter of the application can be obtained when the following detailed description of the disclosed embodiments is considered in conjunction with the following drawings, in which:

FIGS. 4A and 4B illustrate a flow diagram of a method in accordance with an embodiment of the subject matter of the present application.

DETAILED DESCRIPTION OF THE DRAWINGS

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those skilled in the art will appreciate that some of the acts and operations described hereinafter can also be implemented in hardware, software, and/or firmware and/or some combination thereof.

Figure 1:
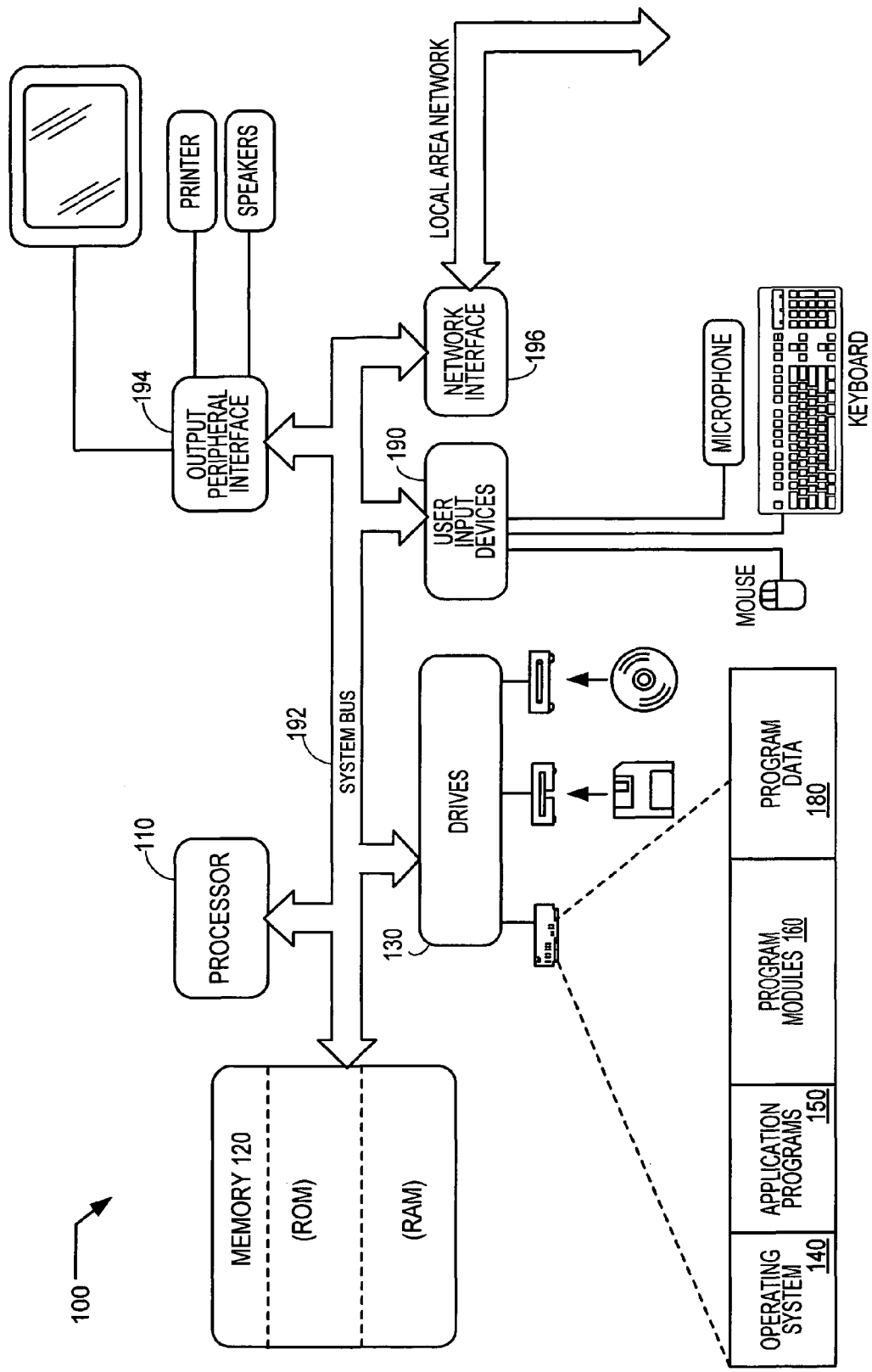
FIG. 1 is a block diagram of an exemplary computer architecture that supports the claimed subject matter of the present application.

With reference to FIG. 1, depicted is an exemplary computing system for implementing embodiments. FIG. 1 includes a computer 100, which could be a portable computer, including a processor 110, memory 120 and one or more drives 130. The drives 130 and their associated computer storage media, provide storage of computer readable instructions, data structures, program modules and other data for the computer 100. Drives 130 can include an operating system 140, application programs 150, program modules 160, and program data 180. Computer 100 further includes user input devices 190 through which a user may enter commands and data. Input devices can include an electronic digitizer, a microphone, a keyboard and a pointing device, commonly referred to as a mouse, trackball or touch pad. Other input devices may include a joystick, game pad, satellite dish, scanner, and the like. In one or more embodiments, user input devices 190 are portable devices that can direct display or instantiation of applications running on processor 110.

These and other input devices can be connected to processor 110 through a user input interface that is coupled to a system bus 192, but may be connected by other interface and bus structures, such as a parallel port, game port or a universal serial bus (USB). Computers such as computer 100 may also include other peripheral output devices such as speakers and/or display devices, which may be connected through an output peripheral interface 194 and the like.

Computer 100 may operate in a networked environment using logical connections to one or more remote computers, such as a remote computer. The remote computer may be a personal computer, a server, a router, a network PC, a peer device or other common network node, and may include many if not all of the elements described above relative to computer 100. Networking environments are commonplace in offices, enterprise-wide computer networks, intranets and the Internet. For example, in the subject matter of the present application, computer 100 may comprise the source machine from which data is being migrated, and the remote computer may comprise the destination machine. Note, however, that source and destination machines need not be connected by a network or any other means, but instead, data may be migrated via any media capable of being written by the source platform and read by the destination platform or platforms. When used in a LAN or WLAN networking environment, computer 100 is connected to the LAN through a network interface 196 or an adapter. When used in a WAN networking environment, computer 100 typically includes a modem or other means for establishing communications over the WAN to environments such as the Internet. It will be appreciated that other means of establishing a communications link between the computers may be used.

According to one embodiment, computer 100 is connected in a networking environment such that processor 110 can process incoming data, such as multimedia data, multimedia streams, multimedia content such as audio and/or video content and the like. The incoming data can be to and/or from a portable device or from another data source.

Figure 2:
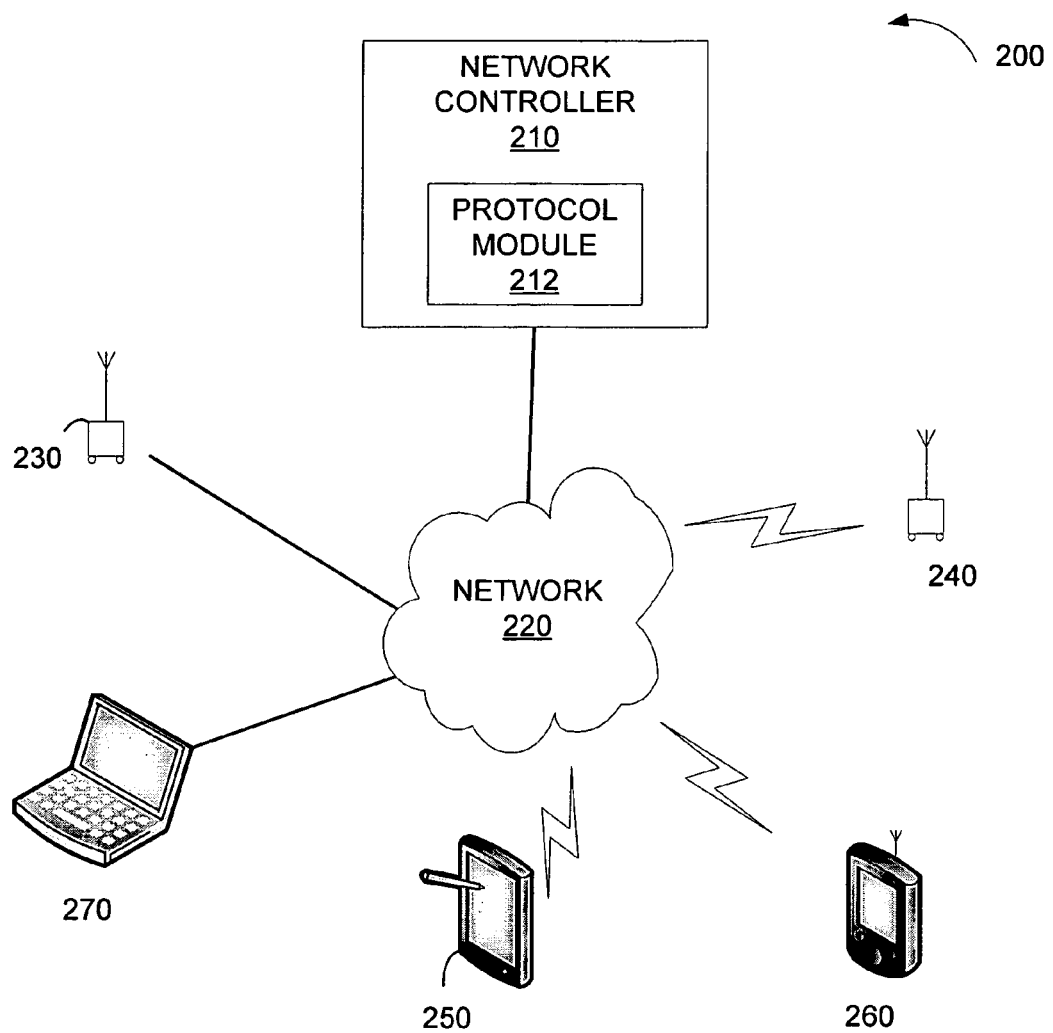
FIG. 2 is a block diagram of a network environment that supports the claimed subject matter of the present application.

Referring now to FIG. 2, illustrated is an exemplary block diagram of a system 200, including portable devices such as portable computer systems capable of interacting with one or more other computer systems. System 200 is shown including network controller 210, a network 220, and one or more portable devices 230, 240, and 250. Portable devices 230, 240, 250, 260 and 270 may include telephones, wireless telephones, cellular telephones, tablet computers (250), personal digital assistants (260), computer terminals (270) and/or any other devices that are capable of sending and receiving data. As described below, network controller 210 can optionally be disposed within a portable device such as device 230 or the like. For example, the portable device could be disposed within a portable computer system capable of running a network controller 210.

Network controller 210 is connected to network 220. Network controller 210 may be located at a base station, a service center, or any other location on network 220. Network 220 may include any type of network that is capable of sending and receiving communication signals, including signals for multimedia content, data and streaming video.

Network 220 may include a data network, such as the Internet, an intranet, a local area network (LAN), a wide area network (WAN), a cable network, and other like systems that are capable of transmitting multimedia video, streaming video, audio and the like. Network 220 may also include a telecommunications network, such as a local telephone network, long distance telephone network, cellular telephone network, satellite communications network, cable television network and other like communications systems that interact with computer systems to enable set-top boxes or other audio/visual controllers to communicate media and multimedia signals. Network 220 may include more than one network and may include a plurality of different types of networks. Thus, network 220 may include a plurality of data networks, a plurality of telecommunications networks, cable systems, satellite systems and/or a combination of data and telecommunications networks and other like communication systems.

In operation, one of the portable devices 230, 240, 250, 260 or 270, may attempt a communication with a receiving computer system, set-top box, audio/visual controller or network controller. The communication can be routed through network 220 and network controller 210 to the receiving computer system. In an embodiment, network controller 210 is a multimedia content controller capable of determining the type of media content for receiving and/or sending to a portable device. According to an embodiment, network controller 210 can include a protocol module 212 that can determine whether the recipient communication device 240 is requesting streaming video, streaming audio, multimedia content, audio, video, text data or the like. Thus, for example, if network 220 includes several types of data and/or content deliverable to a portable device, the protocol module can be configured to pass only the content and/or data appropriate for the portable device and/or the receiving device. A portable device requesting content can identify itself as capable of receiving data according to a predetermined protocol, including speed of transmission, type of data readable by the portable device, and the like.

Embodiments described herein describe transmitting media content to and/or from a portable device to another device for display. More specifically, embodiments herein describe how a portable device such as portable devices 230, 240, 250, 260 and/or 270 displaying video content can transfer video content to another display with resolution capabilities unavailable and/or unknown to the portable device. Thus, for example, a user of mobile phone displaying video content can transfer user enhancement data associated with multimedia data, multimedia streams, and/or multimedia content. The multimedia data can be metadata, interactive programming data, and the like. The multimedia streams can be video or audio streams.

Figure 3:
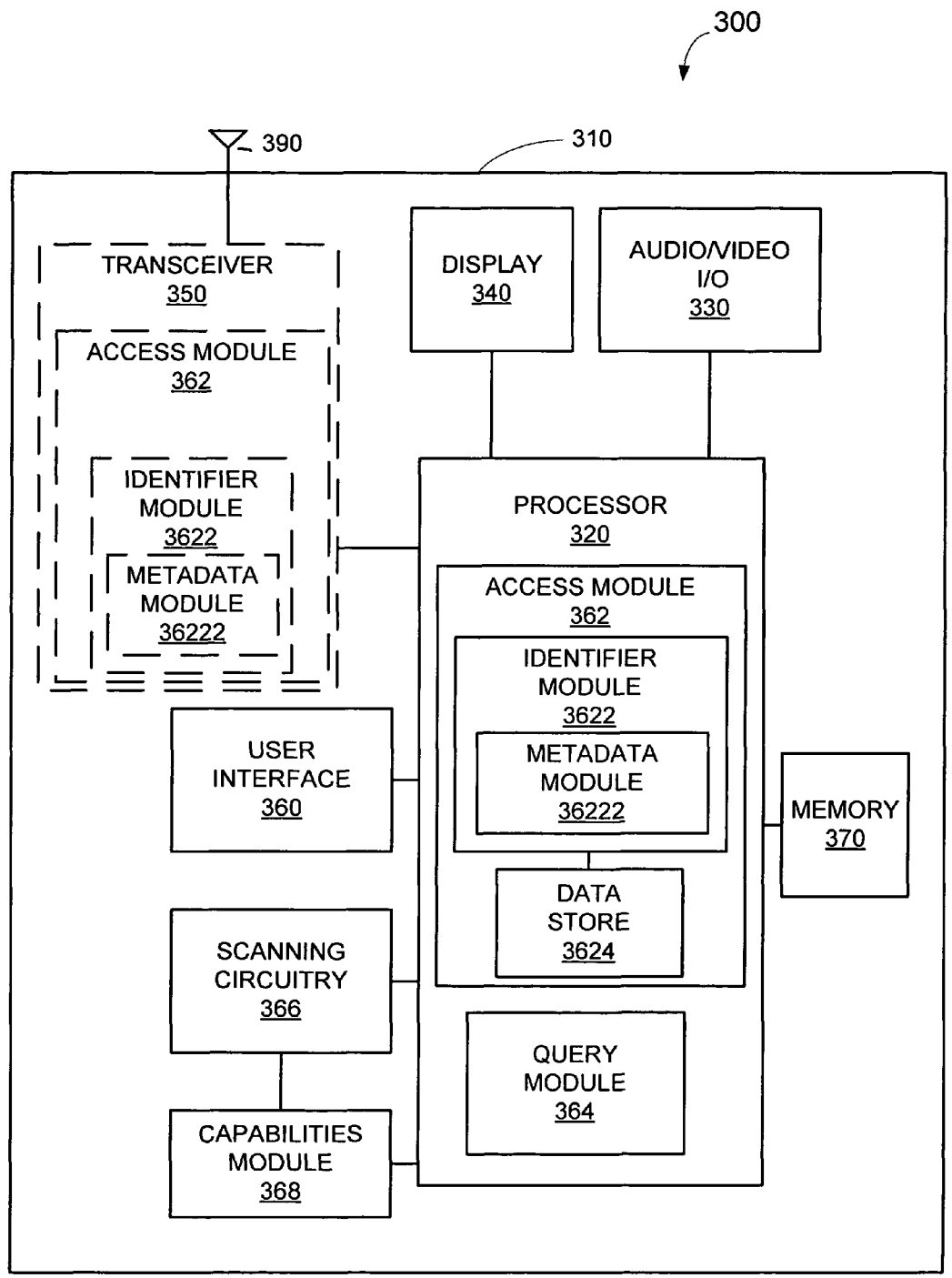
FIG. 3 is a block diagram of a portable device appropriate for embodiments of the subject matter of the present application.

FIG. 3 is an exemplary block diagram of a portable device 300, such as portable devices 230, 240, 250, 260 or 270 according to an embodiment, (e.g. FIG. 2). Portable device 300 can include a housing 310, one or more processors such as processor 320, audio and/or video input and output circuitry 330 coupled to processor 320, a display 340 coupled to processor 320, a user interface 360 coupled to processor 320, a memory 370 coupled to processor 320. Audio and/or video input and/or output circuitry 330 can include one or more of a video display, a microphone, a speaker, a transducer, and/or audio input and/or audio output circuitry.

According to an embodiment, processor 320 includes or is coupled to a user interface module 360. User interface module 360 may be installed within processor 320 or may be installed on hardware coupled to the processor 320. Alternatively, user interface 360 could be located in software in memory 370 and executed by processor 320. Memory 370 can include a random access memory, a read only memory, an optical memory, a subscriber identity module memory, or any other memory that can be coupled to a portable device. Display 340 can be a liquid crystal display (LCD), a light emitting diode (LED) display, a plasma display, or any other means for displaying information and may or may not have a predetermined resolution capability. Audio/video input and output circuitry 330 can include a microphone, a speaker, a transducer, or any other audio input and output circuitry. User interface 360 can include a keypad, buttons, a touch pad, a joystick, an additional display, or any other device useful for providing an interface between a user and a portable device or display coupled to a portable device.

Processor 320 can be configured to control the functions of portable device 300. Portable device 300 can send and receive signals across network 220 using a transceiver 350 coupled to antenna 390. Alternatively, portable device 300 can be a device relying on twisted pair technology.

Transceiver 350 is shown coupled to processor 320 and can be configured for accessing of one or more entities computationally capable of being networked to one or more of the portable device and/or a computing device operable via a user interface. In one embodiment, either or both of processors 320 and/or transceivers 350 can be configured with an access module 362 for accessing the one or more entities computationally capable of being networked. The access module 362 can further be configured to incorporate or configured to instantiate an identifier module 3622, such as an identifier module configured to enable obtaining data identifying a source supplying the user enhancement data associated with one or more of multimedia data, multimedia streams and/or multimedia content to the one or more entities to enable access by the portable device, the identifier module disposed within a transceiver coupled to the one or more processors. For example, an identifier module can include a radio frequency identifier (RFID) type module that receives data identifying the source of content via an RFID protocol, a globally unique identifier (GUID), a protocol following a digital rights management protocol or the like as one with skill in the art with the benefit of the present disclosure will appreciate is appropriate for multimedia content. The identifier module 3622 can further be coupled to a data store 3624 to enable logging the data identifying the source supplying data to the one or more entities to enable an interactive session with the source supplying data. For example, depending on the protocol mandated to enable the identifier module to identify the source of content and/or data, the logging of the data can include logging RFID information, GUID data, or logging the interactions between entities to prevent recurrence of misconnections or incorrect sources of content and data in the future. Additionally, the data store 3624 can hold user authentication data to enable the portable device 300 to have access to sources of data otherwise unavailable to a user without authentication.

In one embodiment, the identifier module 3622 is configured to include or have access to a metadata module 36222, Metadata module 36222 can be configured for accessing a remote server and/or a set-top box, audio/visual controller and/or a multimedia data controller to obtain metadata for the interactive session. For example, metadata module 36222 could include application programming interface (API) code to enable a processor operating with an audio and/or visual controller to interact with networked entities.

According to an embodiment, a user can use either the user interface 360 for input and output of information to and from portable device 300 or use input and output using the audio/video input and output circuitry 330. Data received by portable device 300 can be visually displayed on display 340 and/or provided audibly through audio/video input and output circuitry 330. For example, multimedia applications can be stored on memory 370 and processed by processor 320 to be output via either or both of a visual and/or audio output.

According to one embodiment, the processor 320 and/or access module 362 can determine which entities are computationally capable of being networked via scanning circuitry 366 configured for scanning for one or more electronic transmissions from the one or more entities computationally capable of being networked to the portable device. For example, processor 320 in combination with scanning circuitry 366 can be configured to receive wireless or other forms of network electronic transmissions from entities computationally capable of networking with the portable device. Such entities can include other portable devices, signal-generating entities, such as broadcast entities, satellite entities and the like.

Scanning circuitry 366, can further be coupled to capabilities module 368 wherein the capabilities module is configured for determining which of the one or more entities computationally capable of being networked to the portable device to access.

Other computationally capable entities being networked to the portable device can further include communications entities such as cellular service companies, cable service companies, digital subscriber line companies, movies-on-demand companies and the like that have network capabilities. For example, a cable service company following a DOCSIS protocol could enable a portable device to connect to services following a DOCSIS protocol to provide video services which could include streaming video, pay-per-view movies, audio services, radio services and the like.

Referring now to FIG. 4A and 4B, an exemplary flow diagram illustrates the operation of the processor 320 and/or network controller 210 according to an embodiment. One of skill in the art with the benefit of the present disclosure will appreciate that act(s) can be taken by network controller 210 and/or processor 110.

FIGS. 4A and 4B provide methods for operating a portable device to transfer entertainment data to and from the portable device and a second device. The second device can be a fixed device, another portable device or the like.

Block 410 provides for accessing of one or more entities computationally capable of being networked to one or more of the portable device and/or a computing device operable via a user interface. For example, processor 320 and/or access module 362 can be configured to access entities computationally capable of being networked to a portable device 300 or computing device such as computer 100. Access module 362 can include code for directing a modem, a wireless detector, a network connection or the like and will be appreciated by one of skill in the art with the benefit of this disclosure. Depicted within block 410, block 4102 provides for scanning for one or more electronic transmissions from the one or more entities computationally capable of being networked to the portable device. For example, as shown in FIG. 3, scanning circuitry 366 can be configured to operate with processor 320 and access module 362 to scan an area or other network connections to access the one or more entities computationally capable of being networked to the portable device or computing device. Block 4104 provides for determining which of the one or more entities computationally capable of being networked to the portable device to access. For example, after a scan is performed as provided for in block

4102, block 4104 can provide that processor 320 and/or access module 362 determine an appropriate entity for networking to the portable device. More specifically, access module 362 includes an identifier module 3622 that can be configured to identify a best entity for networking with the portable device.

Block 420 provides for querying of the one or more entities to determine one or more interaction capabilities between the portable device and the one or more entities. For example, after an entity is chosen for networking, query module 364 can perform query tasks to determine the extent of interaction possible between the entity and the portable device. In some cases, the limiting factor for interaction could be the portable device capabilities, and in other cases, the limiting factor for interaction could be the entity networked to the portable device. To determine the limiting factor, query module 364 can be configured to determine the interaction capabilities of one or more entities by pinging or otherwise connecting with an entity and performing a handshake protocol wherein the networking connection is established and following the connection, exchanging protocol data to determine whether transfer of media content or parameters describing media content is appropriate for the entity. Depicted within block 420 is block 4202 which provides for determining a protocol for interacting with the one or more entities. For example, query module 364 can determine the protocol using a handshake or other appropriate method of exchanging protocol data.

Also depicted within block 420 is block 4204 which provides for obtaining data identifying a source supplying the user enhancement data associated with one or more of multimedia data, multimedia streams and/or multimedia content to the one or more entities to enable access by the portable device. For example, referring to FIG. 3, access module 362 is configured to include an identifier module 3622 which can be configured to identify whether the one or more entities are sources that can supply multimedia data, multimedia data streams and/or multimedia content or whether the one or more entities must connect with an outside source of the multimedia data and/or content and/or multimedia data streams. An entity can interact with a portable device by responding to commands or requests from the portable device.

Depicted within block 4204 is block 42042 which provides for retrieving interactive program guide data and/or content data for instantiation on the portable device to enable a user to operate the one or more entities from the portable device. For example, processor 320 and access module 362 can be configured to retrieve interactive program guide data and/or content via transceiver 350. Also depicted within block 4204 is block 42044 which provides for logging the data identifying the source supplying data to the one or more entities to enable an interactive session with the source supplying data. For example, processor 320 in combination with data store 3624 can be configured to log data identifying a source capable of supplying the content, data, multimedia streams, multimedia content and the like. Data store 3624 can hold data identifying the source by logging protocol data determined by query module 364 and identification data from identifier module 3622. The logged data can further include logging radio frequency identification (RFID) data, globally unique identifier (GUID) data, or logging the interactions between entities to prevent recurrence of misconnections or incorrect sources of content and data in the future. Depicted within block 42044 is block 420442 which provides for storing the data identifying the source supplying data to prevent requiring a subsequent logging of the data identifying the source supplying data. For example, data store 3624 can be configured to store data identifying the source of data. The stored data can include authentication data and the like.

Block 4204 is followed by block 4206 which provides for accessing a remote server and/or a set-top box, audio/visual controller and/or a multimedia data controller to obtain metadata for the interactive session. For example, processor 320 in combination with access module 362 and transceiver 350 can access a remote server, set-top box, audio/visual controller and/or a multimedia data controller.

Referring now to FIG. 4B, block 430 provides for actuating user enhancement data in association with one or more of multimedia data, multimedia streams and/or multimedia content on the portable device retrieved from the one or more entities and/or a source operably coupled to the one or more entities. For example, processor 320 in combination with transceiver 350, display 340 and/or audio/video input/output 330 can direct actuation of entertainment data, such as multimedia data, multimedia content streams and the like.

Depicted within block 430 is block 4302 which provides for displaying on the portable device one or more of preview data, program content and/or content with metadata and/or distilled content versions of multimedia data streams and/or video and or audio streams, on-screen data, and/or live program stream data, and/or scene information related to data available to/from the one or more entities. For example, display 340 can be configured to operate with processor 320 to display the preview data, program content, metadata and content and data streams such as distilled content and the like. Depicted within block 4302 is block 43022 which provides for displaying on the portable device implemented as one or more of a cellular phone, a personal digital assistant, a mobile phone, a portable computing device, and/or a universal remote control with networking capabilities. For example, a portable device that is a mobile phone can include a display appropriate for streaming video and/or audio output.

Also depicted within block 4302 is block 43024 which provides for receiving metadata from the one or more entities. For example, metadata module 36222 can be configured to receive metadata via transceiver 350 and processor 320. Block 43026 is also depicted within block 4302 and provides for processing the metadata to enable a user interface installed on the portable device to implement one or more of an interactive session with the one or more entities and/or a display of the metadata according to the user interface. For example, processor 320 can be configured to process the metadata. Thus, metadata stored in data store 3624 and/or metadata module 36222 can be processed by processor 320 to enable instructions received via user interface 360 to be implemented in an interactive session.

Depicted within block 43026 is block 430262, which provides for using the metadata to determine which of a plurality of display capabilities of the portable device to enable for data retrieved from the one or more entities and/or data retrieved from a remote server providing the metadata related to the data available to the one or more entities.

Also depicted within block 4302 is block 43027, which provides for retrieving interactive program data related to the data available to the one or more entities. For example, processor 320 in combination with transceiver 350 can retrieve interactive program data.

Following block 43027 is block 43028 which provides for parsing the interactive program data for a subset appropriate for the portable device. Thus, for example, the retrieved interactive program data can be parsed to determine appropriate data for display or actuation by the mobile device.

Also depicted in block 4302 is block 43029 which provides for processing the data related to the data available to the one or more entities according to one or more user-centric parameters. For example, processor 320 can process the data related to the data available to the one or more entities. For example, if the one or more entities include a cable system audio/visual controller, the data for display via the cable system can be processed via processor 320.

Block 430 also depicts block 4304, which provides for receiving metadata related to the one or more entities at the portable device to enable the user interface to instantiate entertainment data. For example, processor 320 can receive metadata via metadata module 36222 and receive instructions via user interface 360 to instantiate data received over transceiver 350.

Those with skill in the computing arts will recognize that the disclosed embodiments have relevance to a wide variety of applications and architectures in addition to those described above. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified blocks performed in the same or a different order.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.)

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

We claim:

1. A portable device comprising:
   circuitry for scanning for one or more transmissions to identify at least one entity from one or more other entities;
   circuitry for obtaining from the at least one entity, and in response to one or more queries, program information and identification information associated with at least one source of at least some media content suppliable to the at least one entity; and
   circuitry for enabling at least one interactive session with the at least one source for accessing at least one portion of the at least some media content via at least one path that is independent of the at least one entity.

2. The portable device of claim 1, wherein the circuitry for scanning for one or more transmissions to identify at least one entity from one or more other entities comprises:
   circuitry for scanning for one or more transmissions to identify at least one set top box from one or more other entities.

3. The portable device of claim 1, wherein the circuitry for scanning for one or more transmissions to identify at least one entity from one or more other entities comprises:
   circuitry for scanning for one or more transmissions to identify at least one audio device from one or more other entities.

4. The portable device of claim 1, wherein the circuitry for scanning for one or more transmissions to identify at least one entity from one or more other entities comprises:
   circuitry for scanning for one or more transmissions to identify at least one cable associated receiver from one or more other entities.

5. The portable device of claim 1, wherein the circuitry for scanning for one or more transmissions to identify at least one entity from one or more other entities comprises:
   circuitry for scanning for one or more transmissions to identify at least one television associated receiver from one or more other entities.

6. The portable device of claim 1, wherein the circuitry for scanning for one or more transmissions to identify at least one entity from one or more other entities comprises:
   circuitry for scanning for one or more transmissions to identify at least one portable device from one or more other entities.

7. The portable device of claim 1, wherein the circuitry for scanning for one or more transmissions to identify at least one entity from one or more other entities comprises:
   circuitry for scanning for one or more transmissions to identify at least one satellite associated receiver from one or more other entities.

8. The portable device of claim 1, wherein the circuitry for scanning for one or more transmissions to identify at least one entity from one or more other entities comprises:
   circuitry for scanning for one or more RFID transmissions to identify at least one entity from one or more other entities.

9. The portable device of claim 1, wherein the circuitry for scanning for one or more transmissions to identify at least one entity from one or more other entities comprises:

circuitry for scanning for one or more wireless transmissions to identify at least one entity from one or more other entities.

10. The portable device of claim 1, wherein the circuitry for scanning for one or more transmissions to identify at least one entity from one or more other entities comprises:
circuitry for scanning for one or more transmissions to identify at least one entity from one or more different entities.

11. The portable device of claim 1, wherein the circuitry for scanning for one or more transmissions to identify at least one entity from one or more other entities comprises:
circuitry for scanning for one or more transmissions from two or more entities.

12. The portable device of claim 1, wherein the circuitry for obtaining from the at least one entity and in response to one or more queries, program information and identification information associated with at least one source of at least some media content suppliable to the at least one entity comprises:
circuitry for obtaining from the at least one entity, and in response to one or more user requests, program information and identification information associated with at least one source of at least some media content suppliable to the at least one entity.

13. The portable device of claim 1, wherein the circuitry for obtaining from the at least one entity and in response to one or more queries, program information and identification information associated with at least one source of at least some media content suppliable to the at least one entity comprises:
circuitry for obtaining from the at least one entity, and in response to one or more queries, program information and at least one URL associated with at least one source of at least some media content suppliable to the at least one entity.

14. The portable device of claim 1, wherein the circuitry for obtaining from the at least one entity and in response to one or more queries, program information and identification information associated with at least one source of at least some media content suppliable to the at least one entity comprises:
circuitry for obtaining from the at least one entity, and in response to one or more queries, program information and identification information associated with at least one internet source of at least some media content suppliable to the at least one entity.

15. The portable device of claim 1, wherein the circuitry for obtaining from the at least one entity and in response to one or more queries, program information and identification information associated with at least one source of at least some media content suppliable to the at least one entity comprises:
circuitry for obtaining from the at least one entity, and in response to one or more queries, program content and identification information associated with at least one source of at least some media content suppliable to the at least one entity.

16. The portable device of claim 1, wherein the circuitry for obtaining from the at least one entity and in response to one or more queries, program information and identification information associated with at least one source of at least some media content suppliable to the at least one entity comprises:
circuitry for obtaining from the at least one entity, and in response to one or more queries, program guide information and identification information associated with at least one source of at least some media content suppliable to the at least one entity.

17. The portable device of claim 1, wherein the circuitry for obtaining from the at least one entity and in response to one or more queries, program information and identification information associated with at least one source of at least some media content suppliable to the at least one entity comprises:
circuitry for obtaining from the at least one entity, and in response to one or more queries, program information and identification information associated with at least one source supplying at least some media content to the at least one entity.

18. The portable device of claim 1, wherein the circuitry for obtaining from the at least one entity and in response to one or more queries, program information and identification information associated with at least one source of at least some media content suppliable to the at least one entity comprises:
circuitry for obtaining from the at least one entity, and in response to one or more queries, program information and identification information associated with at least one source of at least some media content supplied to the at least one entity.

19. The portable device of claim 1, wherein the circuitry for obtaining from the at least one entity and in response to one or more queries, program information and identification information associated with at least one source of at least some media content suppliable to the at least one entity comprises:
circuitry for obtaining wirelessly from the at least one entity, and in response to one or more queries, program information and identification information associated with at least one source of at least some media content suppliable to the at least one entity.

20. The portable device of claim 1, wherein the circuitry for enabling at least one interactive session with the at least one source for accessing at least one portion of the at least some media content via at least one path that is independent of the at least one entity comprises:
circuitry for enabling at least one interactive session with the at least one source for accessing at least some pay-per-view content via at least one path that is independent of the at least one entity.

21. The portable device of claim 1, wherein the circuitry for enabling at least one interactive session with the at least one source for accessing at least one portion of the at least some media content via at least one path that is independent of the at least one entity comprises:
circuitry for enabling at least one interactive session with the at least one source for accessing at least some preview content via at least one path that is independent of the at least one entity.

22. The portable device of claim 1, wherein the circuitry for enabling at least one interactive session with the at least one source for accessing at least one portion of the at least some media content via at least one path that is independent of the at least one entity comprises:
circuitry for enabling at least one interactive session with the at least one source for accessing at least some live content via at least one path that is independent of the at least one entity.

23. The portable device of claim 1, wherein the circuitry for enabling at least one interactive session with the at least one source for accessing at least one portion of the at least some media content via at least one path that is independent of the at least one entity comprises:
circuitry for enabling at least one interactive session with the at least one source for accessing at least some distilled content via at least one path that is independent of the at least one entity.

24. The portable device of claim 1, wherein the circuitry for enabling at least one interactive session with the at least one source for accessing at least one portion of the at least some media content via at least one path that is independent of the at least one entity comprises:

circuitry for enabling at least one interactive session with the at least one source for accessing at least some program information via at least one path that is independent of the at least one entity.

25. The portable device of claim 1, wherein the circuitry for enabling at least one interactive session with the at least one source for accessing at least one portion of the at least some media content via at least one path that is independent of the at least one entity comprises:

circuitry for enabling at least one interactive session with the at least one source for accessing at least some scene information via at least one path that is independent of the at least one entity.

26. The portable device of claim 1, wherein the circuitry for enabling at least one interactive session with the at least one source for accessing at least one portion of the at least some media content via at least one path that is independent of the at least one entity comprises:

circuitry for enabling at least one interactive session with the at least one source for accessing at least some metadata via at least one path that is independent of the at least one entity.

27. The portable device of claim 1, wherein the circuitry for enabling at least one interactive session with the at least one source for accessing at least one portion of the at least some media content via at least one path that is independent of the at least one entity comprises:

circuitry for enabling at least one interactive session with the at least one source for accessing at least some user-centric content via at least one path that is independent of the at least one entity.

28. The portable device of claim 1, wherein the circuitry for enabling at least one interactive session with the at least one source for accessing at least one portion of the at least some media content via at least one path that is independent of the at least one entity comprises:

circuitry for enabling at least one interactive session with the at least one source for accessing at least some video content via at least one path that is independent of the at least one entity.

29. The portable device of claim 1, wherein the circuitry for enabling at least one interactive session with the at least one source for accessing at least one portion of the at least some media content via at least one path that is independent of the at least one entity comprises:

circuitry for enabling at least one interactive session with the at least one source for accessing at least some image content via at least one path that is independent of the at least one entity.

30. The portable device of claim 1, wherein the circuitry for enabling at least one interactive session with the at least one source for accessing at least one portion of the at least some media content via at least one path that is independent of the at least one entity comprises:

circuitry for enabling at least one interactive session with the at least one source for accessing at least some audio content via at least one path that is independent of the at least one entity.

31. The portable device of claim 1, wherein the circuitry for enabling at least one interactive session with the at least one source for accessing at least one portion of the at least some media content via at least one path that is independent of the at least one entity comprises:

circuitry for enabling at least one interactive session with the at least one source for accessing at least some text content via at least one path that is independent of the at least one entity.

32. The portable device of claim 1, wherein the circuitry for enabling at least one interactive session with the at least one source for accessing at least one portion of the at least some media content via at least one path that is independent of the at least one entity comprises:

circuitry for enabling at least one interactive session with the at least one source for accessing at least some enhancement data via at least one path that is independent of the at least one entity.

33. The portable device of claim 1, wherein the circuitry for enabling at least one interactive session with the at least one source for accessing at least one portion of the at least some media content via at least one path that is independent of the at least one entity comprises:

circuitry for enabling at least one interactive session with the at least one source for accessing at least some device appropriate content via at least one path that is independent of the at least one entity.

34. The portable device of claim 1, wherein the circuitry for enabling at least one interactive session with the at least one source for accessing at least one portion of the at least some media content via at least one path that is independent of the at least one entity comprises:

circuitry for enabling at least one interactive session with the at least one source for accessing at least one portion of the at least some media content via at least one wireless network path that is independent of the at least one entity.

35. The portable device of claim 1, wherein the circuitry for enabling at least one interactive session with the at least one source for accessing at least one portion of the at least some media content via at least one path that is independent of the at least one entity comprises:

circuitry for enabling at least one interactive session with the at least one source for accessing at least one portion of the at least some media content from the at least one source via at least one path that is independent of the at least one entity.

36. The portable device of claim 1, wherein the circuitry for enabling at least one interactive session with the at least one source for accessing at least one portion of the at least some media content via at least one path that is independent of the at least one entity comprises:

circuitry for enabling at least one interactive session with the at least one source for streaming at least one portion of the at least some media content via at least one path that is independent of the at least one entity.

37. The portable device of claim 1, further comprising:

circuitry for transmitting at least one portion of the at least some media content to one or more other devices.

38. A portable device comprising:

one or more non-transitory media bearing one or more instructions for facilitating operations including scanning for one or more transmissions to identify at least one entity from one or more other entities;

obtaining from the at least one entity, and in response to one or more queries, program information and identification information associated with at least one source of at least some media content suppliable to the at least one entity; and enabling at least one interactive session with the at least one source for accessing at least one portion of the at least some media content via at least one path that is independent of the at least one entity.

39. A method at least partially implemented using one or more portable devices comprising:

scanning for one or more transmissions to identify at least one entity from one or more other entities;

obtaining from the at least one entity, and in response to one or more queries, program information and identification information associated with at least one source of at least some media content suppliable to the at least one entity; and enabling at least one interactive session with the at least one source for accessing at least one portion of the at least some media content via at least one path that is independent of the at least one entity.

* * * * *